US008473956B2

(12) United States Patent
Kindel et al.

(10) Patent No.: US 8,473,956 B2
(45) Date of Patent: Jun. 25, 2013

(54) PRIORITY BASED SCHEDULING SYSTEM FOR SERVER

(75) Inventors: Charles E. Kindel, Bellevue, WA (US); James Christopher Gray, Bellevue, WA (US); Neil S. Fishman, Redmond, WA (US); James M. Lyon, Redmond, WA (US); Alexander Dadiomov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1153 days.

(21) Appl. No.: 12/014,745

(22) Filed: Jan. 15, 2008

(65) Prior Publication Data

US 2009/0183162 A1    Jul. 16, 2009

(51) Int. Cl.
*G06F 9/46*    (2006.01)

(52) U.S. Cl.
USPC .......................................... 718/102; 718/103

(58) Field of Classification Search
None
See application file for complete search history.

(56) References Cited

U.S. PATENT DOCUMENTS

| 5,745,778 | A | 4/1998 | Alfieri |
| 6,263,359 | B1 | 7/2001 | Fong et al. |
| 7,082,607 | B2 | 7/2006 | Lake et al. |
| 7,093,250 | B1 | 8/2006 | Rector |
| 2002/0073129 | A1 | 6/2002 | Wang et al. |
| 2003/0037091 | A1 | 2/2003 | Nishimura et al. |
| 2006/0101400 | A1* | 5/2006 | Capek et al. ................... 717/120 |
| 2006/0136499 | A1* | 6/2006 | Aboulnaga et al. ........... 707/200 |
| 2006/0190943 | A1 | 8/2006 | Haeri |
| 2007/0113053 | A1 | 5/2007 | Jensen et al. |
| 2008/0077928 | A1* | 3/2008 | Matsuzaki et al. ............ 718/104 |
| 2009/0113435 | A1* | 4/2009 | Mizrachi et al. .............. 718/102 |

OTHER PUBLICATIONS

Miller, "A Heterogeneous Multiprocessor Design and the Distributed Scheduling of its Task Group Workload", 1982, IEEE, pp. 283-290.
Harbour et al., "Timing Analysis for Fixed Priority Scheduling of Hard Real-Time Systems", 1994, pp. 27.
Gao et al., "Implementation Synthesis of Embedded Software under the Group-Based Scheduling Model", Proceedings of the 12th IEEE International Conference on Embedded and Real-Time Computing Systems and Applications, 2006, IEEE, pp. 7.
Anjum et al., "Bulk Scheduling with Diana Scheduler", 2006, pp. 4.

* cited by examiner

*Primary Examiner* — Emerson Puente
*Assistant Examiner* — Dong Kim
(74) *Attorney, Agent, or Firm* — Michael B Dodd; Dodd Law Group

(57) ABSTRACT

A priority based scheduling system for a server prioritizes multiple tasks that are defined using various constraints, which may include relationships defined between different tasks, performance parameters for each task, and completion constraints. The system may track actual performance of a task and update the performance parameters over time. Some embodiments may include a status monitoring agent that may detect that a monitored network parameter has changed that may cause a scheduled task to be raised or lowered in priority. The system may be used to schedule and execute one time tasks as well as recurring tasks, and may execute those tasks during a rigid or flexible periodic time window. Many of the tasks may be pausable and resumable, and such tasks may be performed in increments over successive time windows.

17 Claims, 3 Drawing Sheets

100 — SYSTEM FOR EXECUTING PRIORITIZED TASKS

PRIORITY BASED SCHEDULING SYSTEM FOR SERVER

BACKGROUND

Server computers may perform many different tasks that maintain a network or provide services for computers attached to the network. For example, server computers may backup data from various client computers, update software and services on client computers, and operate various services used by client computers. In many cases, a server may perform such functions during periods of network downtime. In a typical example, a backup operation may be scheduled to perform at night when the client, server, and network are not being used by various users or other tasks.

SUMMARY

A priority based scheduling system for a server prioritizes multiple tasks that are defined using various constraints, which may include relationships defined between different tasks, performance parameters for each task, and completion constraints. The system may track actual performance of a task and update the performance parameters over time. Some embodiments may include a status monitoring agent that may detect that a monitored network parameter has changed that may cause a scheduled task to be raised or lowered in priority. The system may be used to schedule and execute one time tasks as well as recurring tasks, and may execute those tasks during a rigid or flexible periodic time window. Many of the tasks may be pausable and resumable, and such tasks may be performed in increments over successive time windows.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
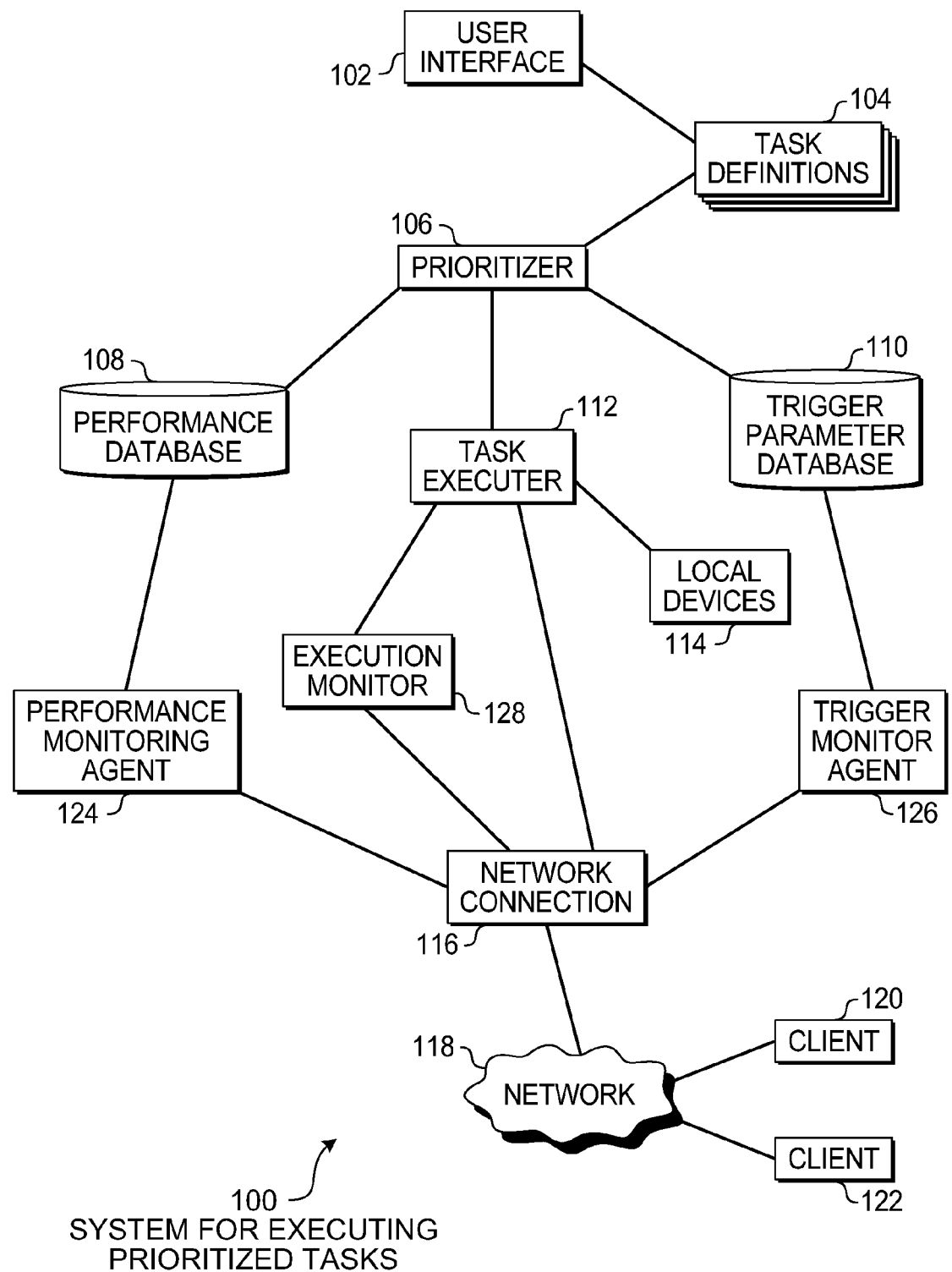
FIG. 1 is a diagram illustration of an embodiment showing a system for executing prioritized tasks.

A scheduling system may create priorities for various tasks using performance parameters, relationships between tasks, and triggering parameters. One use scenario for such a scheduling system may be to schedule various tasks that may be performed by a network server. An example may be scheduling backup operations, defragmentation of a disk drive, updating software, and other periodic operations.

The tasks may be defined in terms of performance parameters. For example, a defragmentation task may use a large amount of disk resources but a small amount of processor or network resources. A backup operation may use a large amount of disk resources and network resources, but a small amount of processor resources. A transcoding operation where one file may be converted into a different format may consume large amounts of processor resources with little disk or network resources.

Some embodiments may prioritize operations by optimizing the various tasks and the resources the tasks may consume. Using the example above, a defragmentation task and a transcoding operation may be performed in parallel, while a backup operation and a defragmentation task may be performed in series.

A performance monitoring agent may be used to track actual performance results and update a task's performance parameters based on historical averages.

Some tasks may have relationships that are expressly defined between the task and other tasks. Some relationships may be dependent or sequential, parallel, exclusive, or other types of relationships.

A task may have a set of triggering parameters associated with the task. A simple triggering parameter may be that a user requested a task to be performed. A more complex triggering parameter may be created by monitoring changes to various parameters that may indicate that a task would be beneficial. In a server example, a trigger monitor may detect that a large number of files were moved on a hard disk. The monitor may determine that a defragmentation operation may improve disk access performance due to the recent file move operation. A defragmentation operation may be raised in priority due to the trigger parameter.

In many embodiments, the tasks may be pausable and resumable tasks and may be performed over one or more time windows. A time window, as in the sever example may be the evening or nighttime period where little or no user operations occur on a network of computers. In some instances, a task may be performed over multiple time windows.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system for executing prioritized tasks. Embodiment 100 is a simplified example used to highlight various characteristics, features, and uses of a prioritizing and scheduling system.

The diagram of FIG. 1 illustrates functional components of a system and may not correspond directly with a hardware or software component of a system. In some cases, a component may be a hardware component, a software component, or a combination of hardware and software. Hardware components may include general purpose components adaptable to perform many different tasks or specially designed components that may be optimized to perform a very specific function. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the various functions described.

Embodiment 100 is an example of a prioritizing and scheduling system such as may be found on a server device that may perform various maintenance or other services on itself or for client devices. In such a use of the embodiment 100, a set of maintenance tasks may be created for a server to perform maintenance on the server or on a client device. The maintenance tasks may include operations such as defragmentation of a local data storage system, cleanup or repair of a file system, consistency checks of backup data, duplication of data on different disks, balancing data loads across disks, scanning the system for faults, backing up local data, installing updates, or any other maintenance operations.

A server device embodiment may also perform various maintenance operations on client devices. For example, backup operations, update installations, or other tasks may be performed across a network connection for various client devices. Such an embodiment may also perform various processor intensive tasks that may be offloaded from a client device to the server. For example, transcoding media files from one format to another may consume large processing resources and may be performed by a server at the request of a client.

The system may use a user interface 102 to enter a set of task definitions 104 that are used by a prioritizer 106 to organize the tasks to be executed. The task definitions 104 may include various aspects of the tasks that may be used to prioritize and sort the tasks to be executed.

The user interface 102 may be any type of input mechanism. In many embodiments, a predefined task may be selected using a graphical user interface. The predefined task may have several variables that may be defined using the user interface 102. In the example of a server computer, a task for defragmenting a local data storage system may be predefined but may have several variables that are user defined, such as selecting the specific disk to defragment and possibly setting various thresholds that may be used to trigger a defragmentation operation. A more complete discussion of the task definition is given in FIG. 2 of this specification.

Multiple task definitions 104 may be prioritized and sorted by the prioritizer 106. The prioritizer 106 may analyze each task definition 104 and determine a priority for the task as well as organize the tasks to be executed. For example, some tasks may be performed in parallel with other tasks, but some other tasks may be performed in sequence with other tasks. In some embodiments, such parameters may be pre-defined for specific tasks, while in other cases a user interface may enable a user to configure some such parameters.

The task executor 112 may be a process that executes individual tasks. The task executor 112 may be capable of starting and stopping tasks and may also be able to resume tasks at various points. Pausable and resumable tasks may be started, executed in part, and paused for a period of time. Then, the task may be resumed at a later time.

In the example of a server with several tasks to perform, a portion of a defragmentation operation may be performed for a period of time each evening during a period of network or server downtime. The defragmentation may be paused in the morning and resumed the next evening, for example. By pausing and resuming tasks, the task executor 112 may be able to manage multiple tasks over multiple time windows.

The task executor 112 may perform tasks that execute on or use local devices 114. An example may be a task that executes on a local server processor and performs an operation that uses a local disk drive. One such task may be a defragmentation operation.

Other tasks may operate through a network connection 116 to a network 118 and may operate on or in conjunction with various network devices 120 and 122. An example may be a task that performs a backup operation from the devices 120 and 122 and stores backup data on a local device 114 such as a local disk drive.

A performance database 108 may be used by the prioritizer 106 to determine a task's priority and how the task may be executed. The performance database 108 may include various parameters that describe the resources that may be used by a task. For example, a task may be classified by the amount of processor resources, disk resources, or network resources used by the task. Each task may have a resource profile that may be used by the prioritizer 106 to determine which tasks, if any, may be performed in parallel as well as estimating the amount of time a task may consume. In some embodiments, a user interface may enable a user to adjust how a task may be prioritized and executed.

In the example of a server, a defragmentation task may use a small amount of processor resource but a large amount of disk resource. Such a task may be run in parallel with a task that may use some processor and network resources but a small amount of disk resource.

The performance database 108 may be updated by a performance monitoring agent 124 that may monitor task activity and collect performance data about the activity. When the actual performance data is different from the data in the performance database, the performance database may be updated.

A trigger parameter database 110 may be used by the prioritizer 106 to raise or lower the priority of a task based on various monitored parameters. The monitored parameters may be collected by a trigger monitor agent 126 that may perform various monitoring or querying functions to determine the status of a trigger parameter.

A trigger parameter may be any monitored parameter that may be used to determine if a task is more or less likely to be executed. Using the defragmentation example, a trigger parameter for defragmentation may be to perform defragmentation when 25% of the files on the disk are fragmented. In such a case, the trigger monitor agent 126 may perform a periodic query to the monitored disk to determine the amount of fragmented files.

Each task may have one or more trigger parameters that may be monitored. In some cases, the trigger parameters may be performance parameters that may indicate the operational characteristics of a server, network, or client device. In other cases, the trigger parameters may be status parameters that indicate settings or other values such as available capacity of a disk.

Some embodiments may use time as a trigger parameter by determining the amount of time elapsed since a previous instance of a task was performed. For example, a backup operation task may be set to be performed at least every seven days on average. During the first couple days after the last backup operation, the backup operation may have a low priority since there were still several days until the seven day average. As the elapsed time grows toward seven days and passes seven days, the priority may be raised higher and higher until the priority is high enough that the backup operation is performed.

The prioritizer system with trigger parameters may enable a group of tasks to be prioritized and executed based on a set of heuristics that may be quite complex. The heuristics may include the analysis of various trigger parameters that may raise or lower a task's priority, as well as an analysis of the expected performance of the task. By combining such factors, the prioritization system may optimize which task may be performed based on when it is most appropriate to perform the task as well as organizing the tasks to make use of the available resources.

The task executor 112 may operate within a predefined or a variable time window. In the example of a server, the time window for network related and server related operations may be set for the evening and nighttime hours. When the time window is rigidly defined, tasks may be executed starting at a predefined hour and be paused or terminated by another hour.

In some embodiments, a variable time window may be used. In such embodiments, an execution monitor 128 may be used to determine if resources are available to begin performing various tasks. Using the server example, an execution monitor 128 may determine that there is very little network activity and that various services operating on the server have very little activity. Based on the lack of activity, the execution monitor 128 may indicate to the task executor 112 that tasks may be started.

In some cases, the execution monitor 128 may detect network activity, activity on a client device 120 or 122, or activity on various local devices 114 and determine that some or all of the tasks may be paused or stopped.

The execution monitor 128 may operate in conjunction with a predetermined time to permit or curtail tasks. For example, a time window may be defined between 7:00 pm and 7:00 am, but the execution monitor 128 may allow tasks to begin early when activity has been below a specific level after 5:00 pm or may refrain from starting tasks until activity has dropped below a specific level or until 2:00 am, whichever comes first. In another example, tasks may be stopped earlier than 7:00 am if activity is detected on the network after 5:00 am.

Throughout this specification, an example of a server is used to exemplify the concepts and functionality of a prioritizer. Other embodiments may use similar functionality but may apply the task definition and prioritization techniques to other applications or use the techniques for other types of prioritized and scheduled tasks. The server example is not meant to be limiting and is chosen as illustrative.

Figure 2:
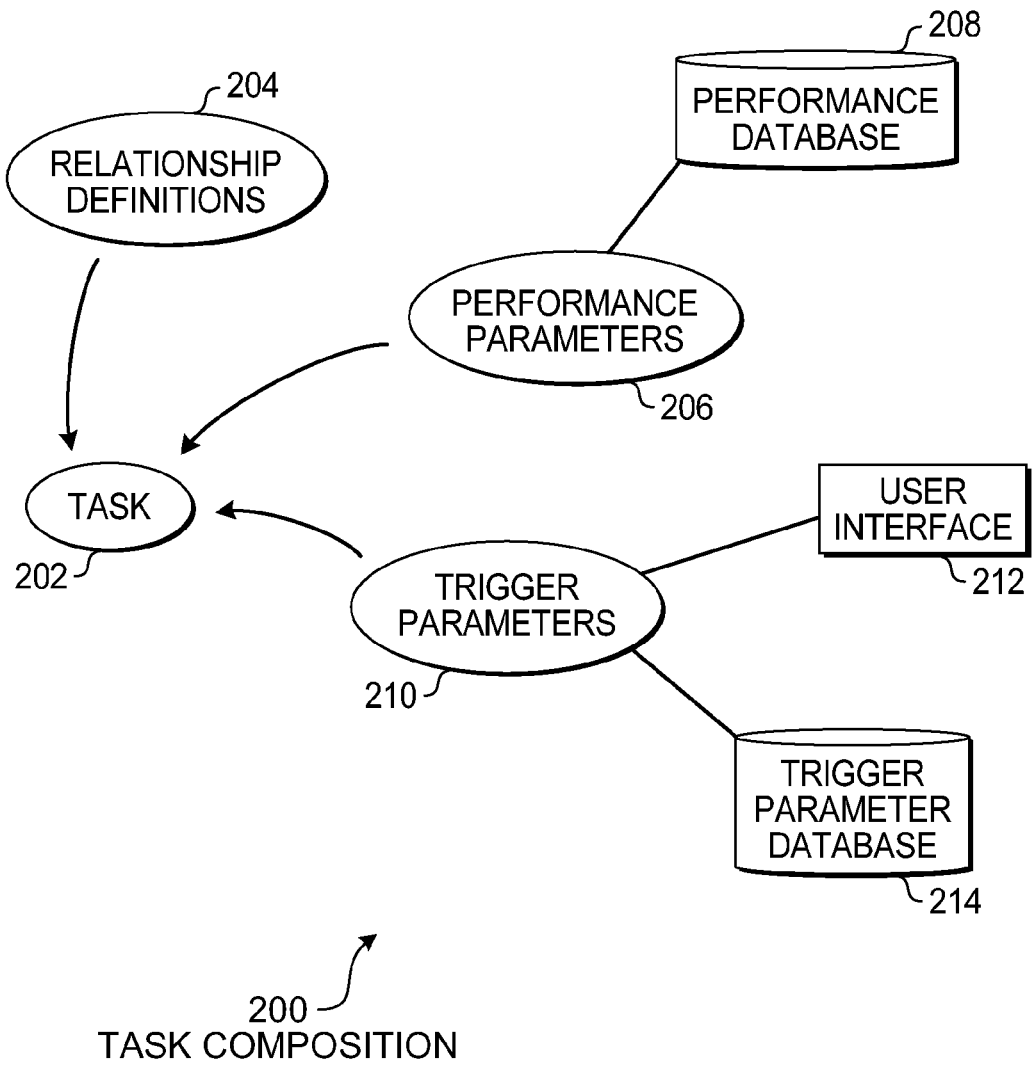
FIG. 2 is a diagram illustration of an embodiment showing the composition of a task.

FIG. 2 is a diagram illustration of an embodiment 200 showing the composition of a task. A task 202 may be comprised of a set of relationship definitions 204, performance parameters 206 that may come from a performance database 208, and trigger parameters 210 that may be derived from a trigger parameter database 214 or a user interface 212.

The task 202 may be used by a prioritizing mechanism to prioritize and sort tasks to determine an optimized manner in which to schedule the tasks.

The relationship definitions 204 may include various relationships between two or more tasks. In some cases, a first task may have a dependent relationship on a second task such that the first task may not be performed until the second task ends. Other relationship definitions may include parallel definitions where two or more tasks may be defined to be able to be operated in parallel. Some relationship definitions may be defined so that a task may be run exclusively with no other tasks operating at the same time. Still other relationship definitions may be a null relationship that may be interpreted as the task has no dependencies.

The performance parameters 206 may be any type of parameter that may define how a task may operate. In the example of a server, a performance parameter may be the amount of processor resources, disk resources, or network resources that a task may consume. The performance parameters 206 may be tailored to the specific system on which the tasks are performed. In some cases, the performance parameters may relate to the device on which a task executor operates, while in other cases, the performance parameters may relate to such a device but may also encompass a network and other devices on the network.

The performance parameters 206 may be used to determine the approximate resource loading that a task may incur. The performance parameters 206 may be used to calculate or estimate the resources that may be used by a task, and such an estimate may be used to determine which tasks may be operated in parallel based on the resource loading.

The performance parameters 206 may include a time factor as one of the resource loading factors. The time factor may make is possible for a prioritizer to determine how much time a task may consume. In some cases, a prioritizer may determine that a task will take substantially longer than an available time window and may execute a portion of the task over successive time windows. Such an analysis may use a time factor that may be included in the performance parameters 206.

The performance database 208 may contain a default or predetermined set of performance parameters for a given task, and those parameters may be updated based on actual performance. For example, the first time a task is performed, a default set of performance parameters may be used to estimate the resource loading or the amount of time a task may take. As the task is performed, a performance monitoring agent may collect actual resource loading and time usage data when the task is performed, and those data may be updated in the performance database 208.

Trigger parameters 210 may be any parameter that may be used to raise or lower a task's priority. In many embodiments, a prioritizer may reference a trigger parameter database 214 to determine the current status of trigger parameters 210 in order to determine a current priority for the task. A trigger monitoring agent may monitor the various trigger parameters and update the trigger parameters periodically. In some embodiments, a prioritizer may perform a real time query of a triggering parameter using a trigger monitoring agent. In other embodiments, a trigger monitoring agent may update trigger parameters asynchronously with the prioritizer.

In some embodiments, the trigger parameters 210 may include user input from a user interface 212. For example, a set of trigger parameters may include a requested completion time, and such a time may be entered using a user interface 212. Other parameters may be entered using a user interface 212 that may raise or lower the priority of a particular task as well.

Figure 3:
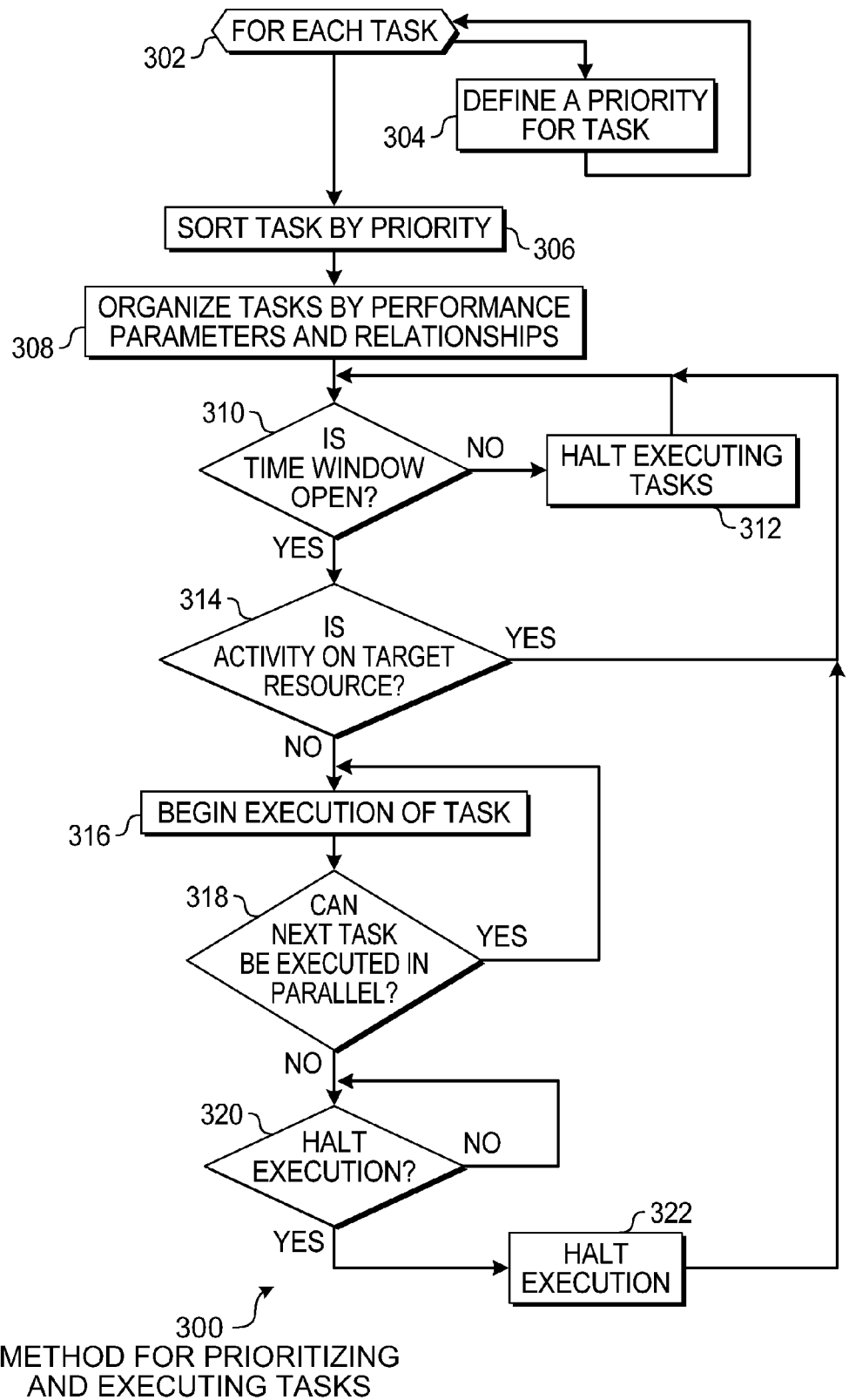
FIG. 3 is a flowchart illustration of an embodiment showing a method for prioritizing and executing tasks.

FIG. 3 is a flowchart illustration of an embodiment 300 showing a method for prioritizing and executing tasks. Embodiment 300 is a simplified example of a sequence of steps that may be used to prioritize and sort tasks and then execute the tasks. Other embodiments may use different terminology or nomenclature and may include additional steps or may combine two or more steps into a single step. In other embodiments, some steps illustrated as serial may be performed in parallel and vice versa.

Embodiment 300 illustrates one method for prioritizing, sorting, and executing tasks. The tasks may be any type of activity that may be paused and resumed by a task executor. In some cases, a task may be executed on the same processor as a task executor, while in other cases, a task executor may operate on one processor or device and cause another processor or device to start, pause, resume, and halt a task on another processor or device.

For each task in block 302, a priority for the task is defined in block 304. A priority may be calculated or otherwise determined using various factors or variables, including the values of trigger parameters associated with a task. In many embodiments, a general priority may be defined for a task, but the priority of an instance of a task may be raised or lowered based on various trigger parameters.

For example, a maintenance task that may be performed on a weekly basis may have a low priority. Such a task may have a trigger parameter established that may cause the task to be a high priority when a certain condition exists. An example of such a task may be a balancing task that maintains at least two copies of a file structure on different hardware devices. The balancing task may have a low priority when only a small amount of data is stored on one device but not copied onto another. However, when a large amount of data is involved, the balancing task may be given a high priority.

Once a priority is established, the tasks may be sorted by priority in block 306. The tasks may be organized by performance parameters and relationships in block 308.

Organizing the tasks in block 308 may involve determining which tasks may be operated in parallel and allocating resources to individual tasks. The relationship definitions that may be used in the task definitions may specify that one task is to be performed after another task or that two tasks may be operated in parallel. Other relationships may also be defined, including an exclusive relationship wherein the task may be operated without any parallel tasks.

Another method for allocating resources and determining which tasks, if any, may be operated in parallel may be to analyze the resource loading of several tasks. Tasks that may be compatible with parallel execution may be those tasks that do not share the same resources, or that share only a portion of a resource.

A time window in block 310 may be used to regulate when tasks may be performed. The time window may be determined by a predetermined configuration and may be rigidly defined. In other embodiments, a time window may be flexible and may be varied by an execution monitor that may determine that the tasks may be performed or not based on a current state of various resources.

If the time window is not open in block 310, any executing tasks may be paused or halted in block 312. If the time window is open in block 310 but activity on a target resource is detected in block 314, the process returns to block 310. A target resource may be any resource that may be used by a task.

For example, a defragmentation task may consume the full bandwidth of a disk resource. If a high level of disk activity is going on, the defragmentation task may be started at a later time so as not to interfere with the current disk activity.

The determination of activity on a resource may use a threshold value of activity. In the example of the defragmentation task, a low level of activity may be sufficient to start defragmentation, but a high level of activity may indicate that some other user or service is currently using the resource.

If the activity on a resource is below a threshold in block 314, the task is begun in block 316. If the next task may be executed in parallel in block 318, the next task is executed in block 316.

If no other tasks may be operated in parallel in block 318, and execution is not to be halted in block 320, the execution continues. If the execution halts because a task is finished, because the resource allocated to the task becomes unavailable, or for some other reason in block 320, the task is halted in block 322 and the process resumes at block 310.

Embodiment 300 is a simplified example of a method by which tasks may be prioritized and executed. In some embodiments, a task may be executed for a period of time, paused, and resumed at a later time. For example, a server may have several tasks of a high priority to execute in a nightly time window. Some of the tasks may be executed for a period of time, such as an hour, and then other tasks may be executed. In block 320, a resource may become unavailable to a task due to a time allocation and may cause the task to be halted. The incomplete task may be reevaluated, re-prioritized, and resumed at a later time, such as when the next time window becomes available.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. At a computer system, a method for executing prioritized computer-related maintenance tasks, the method comprising:
   accessing a plurality of tasks that can be executed at the computer system, the plurality of tasks including a first task and a second task, the first task having an expressly defined relationship with the second task;
   for each task included in the plurality of tasks:
      the task including:
         a set of one or more performance parameters, the set of one or more performance parameters corresponding to computer-related components used by the task, the computer related components including a combination of hardware and software components optimized to perform the task; and
         a set of one or more trigger parameters, each of the one or more trigger parameters used to determine if the task is more or less likely to be executed;
      accessing the set of one or more trigger parameters for the task; and
      assigning a priority to the task based on the accessed set of one or more trigger parameters, the assigned priority relative to the priority of other tasks included in the plurality of tasks;
   identifying the first task for execution based on the assigned priorities;
   executing the first task;
   during execution of the first task:
      monitoring the set of one or more trigger parameters for each of the plurality of tasks;
      monitoring the set of one or more performance parameters for each of the plurality of tasks;
      detecting a change in one or more of a trigger parameter included in the set of one or more trigger parameters monitored for each of the plurality of tasks and a performance parameter included in the set of one or more performance parameters monitored for each of the plurality of tasks, the trigger parameter and the performance parameter associated with one or more tasks from among the plurality of tasks;
      updating one or more specified parameters in at least one of: the set of one or more trigger parameters and the set of one or more performance parameters for each of the associated one or more tasks to reflect the detected change;
      adjusting the priority of the one or more tasks relative to the priority of other tasks included in the plurality of tasks based on the updated one or more specified parameters, adjusting the priority of the one or more tasks comprising: lowering the priority of or raising the priority of each of the one or more tasks;
      analyzing the expressly defined relationship with the second task;
      determining that the first task and the second task can be executed in parallel based on the expressly defined relationship;
      executing the second task based on the determination;
      re-evaluating execution of tasks from among the plurality of tasks based on the adjusted priorities for the one or more tasks: and
      in response to the re-evaluation, permitting the first task to continue executing in parallel with one other task from among the plurality of tasks.

2. The method of claim 1, wherein at least one of the plurality of tasks is further defined by an expected completion time.

3. The method of claim 1, further comprising, prior to executing the identified task, determining that time a window for task execution is open.

4. The method of claim 3, wherein re-evaluating execution of tasks from among the plurality of tasks comprises determining that the time the window for task execution is closed.

5. The method of claim 4, further comprising stopping execution of any of the plurality of tasks in response to the time window being closed.

6. The method of claim 1, wherein accessing the plurality of tasks comprises accessing the plurality of tasks wherein at least one of the plurality of tasks is pausable and resumable based on the updated one or more specified parameters such that the at least one of the plurality of tasks can be completed by incremental partial execution over a plurality of time windows.

7. The method of claim 1, wherein monitoring the set of one or more trigger parameters for each of the plurality of tasks comprises monitoring the elapsed time since a specified task in the associated one or more tasks was last executed; and
   wherein adjusting the priority of the one or more tasks relative to the priority of other tasks included in the plurality of tasks comprises raising the priority of the specified task based on the elapsed time since the specified task was last executed.

8. The method of claim 7, further comprising in response to the re-evaluation, initiating execution of the one other task from among the plurality of tasks.

9. A system comprising:
   a trigger database, the trigger database storing trigger parameters;
   a performance database, the performance database storing performance parameters;
   task definitions defining a plurality of tasks, the plurality of tasks including a first task and a second task, the first task having an expressly defined relationship with the second task, each task in the plurality of tasks including:
      a set of one or more performance parameters from the performance database, each of one or more performance parameters corresponding to a computer-related component the task can use, the computer related components including a combination of hardware and software components optimized to perform the task; and
      a set of one or more trigger parameters, each of the one or more trigger parameters used to determine if the task is more or less likely to be executed; a prioritizer, the prioritizer configured to:
      in response to a user command or a detected change in a trigger parameter or a computer-related component associated with a task and for each of the plurality of tasks:
         access the set of one or more trigger parameters for the task and the set of one or more performance parameters for the task; and
         adjust a priority for the task based on the set of one or more trigger parameters and the set of one or more performance parameters, the priority relative to the priority of other tasks included in the plurality of tasks, adjusting the priority for the task comprising: lowering the priority of the task or raising the priority of the task;

a trigger monitoring agent, the trigger monitoring agent configured to:
  monitor the set of trigger parameters for each of the plurality of tasks during execution of tasks from among the plurality of tasks;
  detect changes in trigger parameters in the set of one or more trigger parameters during execution of tasks from among the plurality of tasks; and
  update the detected changes in trigger parameters in the trigger parameter database;

a performance monitoring agent, the performance monitoring agent configured to:
  monitor corresponding the set of performance parameters for each of the plurality of tasks during execution of tasks from among the plurality of task;
  detect changes in performance parameters in the set of one or more performance parameters during execution of tasks from among the plurality of tasks; and
  update the detected changes in performance parameters in the performance parameter database; and a task executor, the task executor configured to:
  execute the first task;
  analyze the expressly defined relationship with the second task;
  determine that the first task and the second task can be executed in parallel based on the expressly defined relationship;
  execute the second task based on the determination;
  re-evaluate execution of tasks from among the plurality of tasks based on the adjusted task priorities; and
  in response to the re-evaluation of execution, permit the first task to continue executing in parallel with one other task from among the plurality of tasks.

10. The system of claim 9, further comprising:
an execution monitor configured to define the time window based on at least one parameter.

11. The system of claim 10, the execution monitor further configured to define the time window based on a current time.

12. The system of claim 9, the time window being a predefined time window.

13. The system of claim 9, further comprising a user interface configured to receive user commands defining the task definitions.

14. The system of claim 9, further comprising the system being connected to one or more clients over a network; and
wherein the task executor being configured to execute the first task comprises the task executor being configured to execute the first task offloaded from the one or more clients.

15. The system of claim 9, the performance parameters comprising at least one of a group composed of disk usage, network usage, and processor usage.

16. The system of claim 9, the plurality of tasks comprising at least one server maintenance task.

17. A computer program product for use at a computer system, the computer program product for implementing a method for executing prioritized computer-related maintenance tasks, computer program product comprising one or more computer storage hardware devices having stored thereon computer-executable instructions that, when executed, cause the computer system to perform the method, including the following access a plurality of tasks that can be executed at the computer system, the plurality of tasks including a first task and a second task, the first task having an expressly defined relationship with the second task;

for each of the plurality of tasks:
  the task including:
    a set of one or more performance parameters, each of one or more performance parameters corresponding to a computer-related components used by the task, the computer-related components including a combination of hardware and software components optimized to perform the task; and
    a set of one or more trigger parameters, each of the one or more trigger parameters used to determine if the task is more or less likely to be executed;
  access the set of one or more trigger parameters for the task; and
  assign a priority to the task based on the accessed set of one or more trigger parameters, the assigned priority relative to the priority of other tasks included in the plurality of tasks;

identify the first task for execution based on the assigned priorities;

execute the first task;

during execution of the first task:
  monitor the set of one or more trigger parameters for each of the plurality of tasks;
  monitor the set of one or more performance parameters for each of the plurality of tasks;
  detect a change in one or more of a trigger parameter included in the set of one or more trigger parameters monitored for each of the plurality of tasks and a performance parameter included in the set of one or more performance parameters monitored for each of the plurality of tasks, the trigger parameter and the performance parameter associated with one or more tasks from among the plurality of tasks;
  update one or more specified parameters in at least one of: the set of one or more trigger parameters and the set of one or more performance parameters for each of the associated one or more tasks to reflect the detected change;
  adjust the priority of the one or more tasks relative to the priority of other tasks included in the plurality of tasks based on the updated one or more specified parameters, adjusting the priority of the one or more tasks comprising: lowering the priority of or raising the priority of each of the one or more tasks;
  analyze the expressly defined relationship with the second task;
  determine that the first task and the second task can be executed in parallel based on the expressly defined relationship;
  execute the second task based on the determination;
  re-evaluate execution of tasks from among the plurality of tasks based on the adjusted priorities for the one or more tasks; and
  in response to the re-evaluation, permit the first task to continue executing in parallel with one other task from among the plurality of tasks.

* * * * *